No. 651,556. Patented June 12, 1900.
F. M. PRATT.
APPARATUS FOR SEPARATING SOLVENT FROM OIL.
(Application filed Mar. 12, 1900.)
(No Model.)
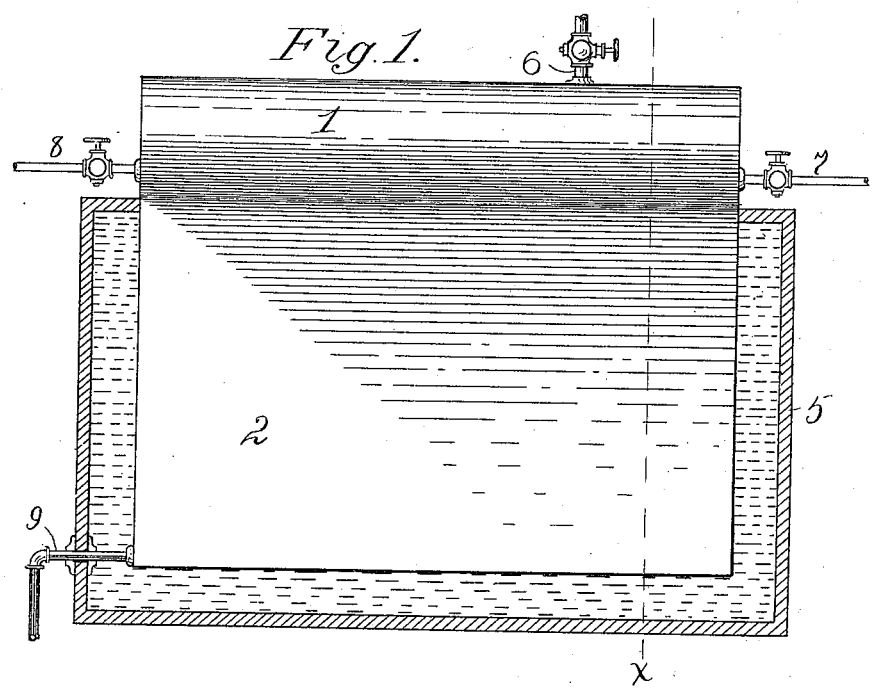
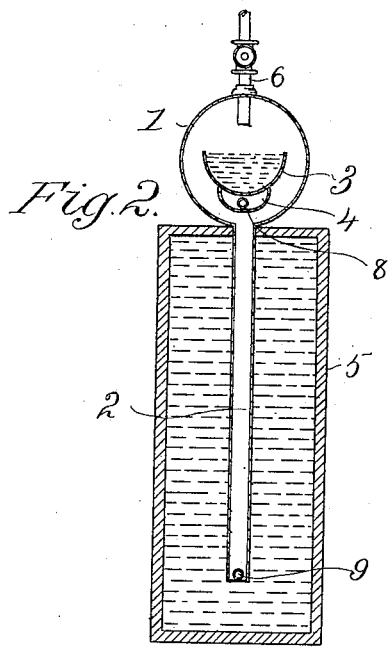
Witnesses
Nora Graham
Ina Graham
Inventor
Frank M. Pratt.
by L. P. Graham
his attorney.

UNITED STATES PATENT OFFICE.

FRANK M. PRATT, OF DECATUR, ILLINOIS.

APPARATUS FOR SEPARATING SOLVENT FROM OIL.

SPECIFICATION forming part of Letters Patent No. 651,556, dated June 12, 1900.

Application filed March 12, 1900. Serial No. 8,315. (No model.)

*To all whom it may concern:*

Be it known that I, FRANK M. PRATT, of the city of Decatur, county of Macon, and State of Illinois, have invented a certain new and useful Apparatus for Separating Solvents from Oil, of which the following is a specification.

This invention relates to the extracting of oil from cereals and the like by the use of volatile solvents, which in vaporized form are heavier than the atmosphere, and its purpose is to separate the solvent from the oil by vaporizing the solvent and to then condense the vapor into liquid form. It is exemplified in the structure hereinafter described, and it is defined in the appended claim.

In the drawings forming part of this specification, Figure 1 is a side elevation of the vaporizing and condensing apparatus, the water-tank surrounding the condensing-leg being shown in vertical section. Fig. 2 is a cross-section of the apparatus on line $x$ in Fig. 1.

A case of preferably-cylindrical form is shown at 1, and at 2 is shown a leg or thin downward extension of the cylinder. A trough 3 extends from end to end of the casing 1, separate from the side walls thereof, and a steam-passage 4 is formed on the bottom of the trough. The leg 2 is inclosed in a water-tank 5, and a pipe 9 in an end of the leg, at the bottom thereof, provides means for drawing off the fluid solvent accumulating in the leg.

In operating the apparatus the trough is filled more or less completely with oil combined with the solvent used in extracting the oil. Steam is fed through a pipe 7 or 8 into the passage 4 until the solvent vaporizes and passes downward into the leg 2, and the action of cold or cool water or the like on the surface of the leg causes the vaporized solvent in the leg to condense into liquid form. Then the oil may be removed from the trough, the solvent may be drawn from the leg, and the trough may be again filled with oil combined with a solvent preparatory to a repetition of the operation.

The pipe 6 exemplifies a means for introducing the combined oil and solvent into the trough, and a discharge-pipe may be connected with the trough wherever it is most convenient.

I claim—

A vaporizing and recondensing apparatus comprising a casing having a downward-extended part surrounded by a cooling-jacket, an imperforate trough in the upper part of the casing and separate from the sides thereof, and a heating-pipe, or chamber, extending along the bottom of the trough.

In testimony whereof I sign my name in the presence of two subscribing witnesses.

FRANK M. PRATT.

Witnesses:
 SEYMOUR CAMPBELL,
 CLEM CRISMAN.